Sept. 13, 1955   S. C. DRESIOS ET AL   2,717,945

RESISTANCE TEMPERATURE DETECTOR

Filed March 30, 1954

Inventors:
Samuel C. Dresios
Walton E. Briggs
by, Richard E. Hosley
Their Attorney

United States Patent Office 2,717,945
Patented Sept. 13, 1955

2,717,945

RESISTANCE TEMPERATURE DETECTOR

Samuel C. Dresios, Lynn, and Walton E. Briggs, Lynnfield Center, Mass., assignors to General Electric Company, a corporation of New York Application March 30, 1954, Serial No. 419,892

6 Claims. (Cl. 201—63)

The present invention relates to temperature detectors and, more specifically, to improved resistance units in which the resistance of electrical windings is related to and enables a measurement of the temperature thereof.

Temperature-sensitive units of the variable resistance type have a long history of use for such purposes as measurement of temperatures of aircraft engine components, fluids, and the windings of massive electrical apparatus. These units function in accordance with the principle that certain conducting materials have resistance vs. temperature characteristics which, over desired temperature ranges, enable precise measurement of different resistances corresponding to discrete temperatures which must be established. Rapidity of response as well as sensitivity are determined largely by the total surface area of resistance material freely exposed to the temperatures under measurement, and by the cross-sectional area of the material. Resistance elements are thus generally constructed with fine conducting wires of as great lengths as the space considerations permit, and with certain supporting and insulating components which are adequate thermal conductors.

In accordance with this invention, resistance detectors having the aforementioned features are further made such that they are of minimized thickness, withstand extremely high pressures and vibrations, are easily manufactured, are resilient and flexible, and are of high dielectric strength and substantially unaffected by certain common short-circuiting conditions. Owing to these characteristics, detectors of the type here disclosed are particularly advantageous in their application to the measurement of temperatures in the windings of large electrical apparatus. For example, generators having ratings of 10 or more kilowatts possess enormous stators with lamination slots in which large insulated bus-bar type turns are embedded one above the other, and proper operation of such generators requires knowledge of the temperatures existing at critical localized areas between adjacent stator turns. By placing thin elongated resistance detectors of the construction disclosed here between these stator turns, suitable temperature measurements may be made. It is desirable that these detectors be non-inductive because of the high intensity magnetic fields present in equipment of this type, and that they also remain undamaged by the severe vibrations encountered in such apparatus. The assembly of large generator stators being largely a manual procedure, with the bus-bar sized turns and small resistance detectors laid in the stator slots and forcefully hammered into place under hardwood wedges, it is further essential that the resistance units be of great flexibility, resistant to abrasion and pressures, and well insulated and designed to avoid short-circuiting of the sensitive resistance wires. Although resistance temperature detectors are relatively inexpensive devices in themselves, improvement in their susceptibility to failure is highly significant when it is recognized that the individual installations which they protect are often valued at over a million dollars each and that over a thousand dollars in expense may be incurred in performing the difficult task of replacing a faulty detector.

Accordingly, it is one object of the present invention to provide improved resistance temperature detectors with vastly reduced susceptibility to failure under conditions of pressure and vibration.

Further, it is an object to provide a thin, simply-fabricated temperature detector which is flexible and resilient and which avoids destructive short-circuiting.

By way of a summary account of one aspect of this invention, I provide a pair of thin elongated parallel cores of insulating fibers, about each of which cores a thin conductive resistance wire is wound helically with a small spacing between turns to preclude shorting. The two cores are slightly spaced in their linear parallel relationship and are molded integrally with and sandwiched between protective and insulating strips of cloth. Polyester resin molding of the parts yields a laminated construction which is thin, flexible, and undistorted by high temperatures. The separate core windings are joined electrically at one end of the unit, with the delicate wires and their junction embedded in and made part of the molded structure. At the opposite end, the fine resistance wires are part of the molded unit and are independently soldered to conducting tabs or connectors which are likewise molded into the structure at least in part so that the danger of breakage or severance of electrical connections is minimized.

Although the features of this invention which are believed to be novel are set forth in the appended claims, the further details of the invention and objects and advantages thereof may be more fully comprehended by reference to the following description taken in connection with the accompanying drawings, wherein:

Figure 4:
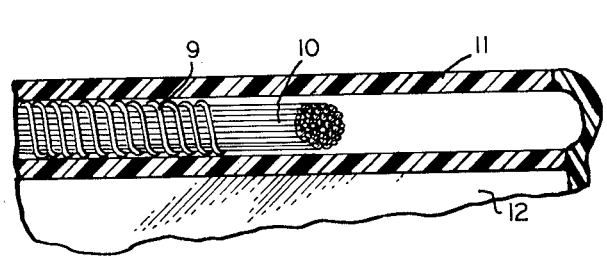
Figure 5:
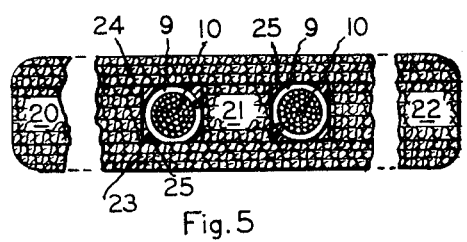

Figure 4 discloses details of a core and helical resistance winding thereon; and Figure 5 represents a cross section of an alternative detector unit.

Figure 1:
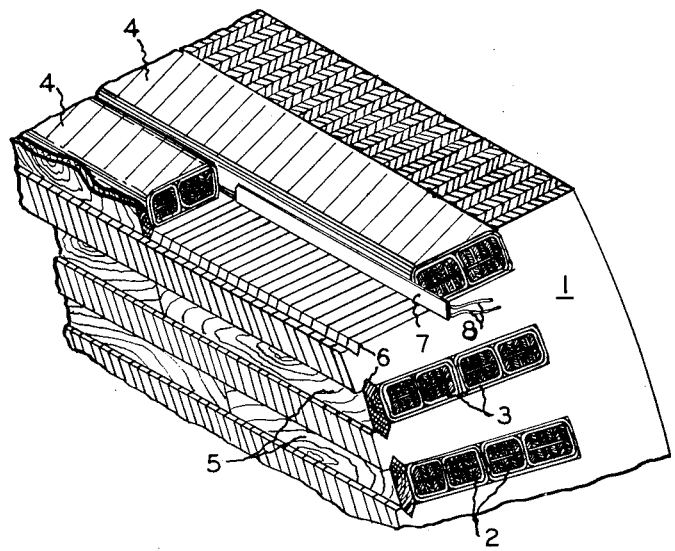
Figure 1 illustrates a portion of a large generator stator unit wherein a resistance temperature detector constructed in accordance with teachings of this invention is employed to sense localized stator temperatures.

One of the intended and preferred applications of this invention, and one which introduces the most pronounced difficulties in apparatus not possessing the advantages of my devices, is in the measurement of localized temperatures in the stators of large electrical generators. A small portion of such a generator is illustrated in Figure 1, the laminated stator core 1 having slots which extend radially in relation to the axis of rotation of the rotor (not shown) and which run the full longitudinal length of the core. Stator windings which recessed in these slots may comprise stacked flattened copper bars 2 which are an inch or more wide and which are heavily wrapped in insulating tape 3. The individual wrapped sets of turns 4 are laid in the stator slots one above the other, and are retained in the slots by hardwood wedges 5 which are fitted in notches 6 in the stator core. A flat resistance temperature detector 7 constructed in accordance with teachings of this invention is portrayed in a position for measurement of the localized temperature between a pair of the wrapped turns 4. A typical detector may measure about 22 inches in length, 1¼ inches in width and 1/16 inch in thickness. Leads 8 are coupled with a suitable measuring system calibrated in terms of temperature. As such generator stators are constructed, the turns 4 are placed in the slots, with a temperature detector between them, and wedges 5 are vigorously hammered into place such that a perfectly tight fit is achieved between the sides of the slot, the turns, and the wedges. During this operation the detector 7 is subjected to high shock and pressure, as well as a certain amount of deformation. When the generator is ultimately put into operation, the severe vibrations and thermally-induced dimensional changes subject the detector to further destructive forces which may tend to rupture or short the fine resistance wires contained in the detector structure.

Figure 2:
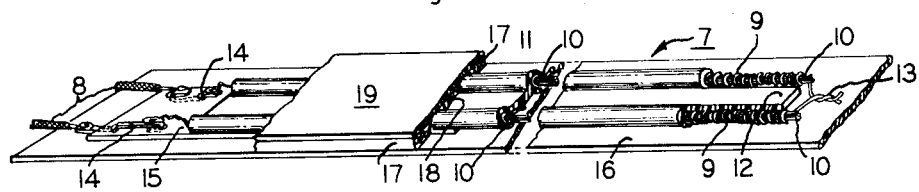
Figure 2 is a cross section of the detector winding arrangement, absent the outer laminations.

In Figure 2, detector 7 is shown with portions broken away to reveal the constructional details. The fine hair-like resistance wire 9 which is employed to sense temperature is wound in helical form on each of two linear cores 10 comprised of numerous small insulating fibers, glass fibers being preferred. It will be appreciated that the glass string cores are both flexible and heat-resistant, and, with the resistance wire 9 wound about the cores in close turns, the assembled core and winding remains entirely flexible. The helical windings on the two cores are preferably in opposite angular directions, such that the intense magnetic fields in which the detector is positioned will induce no net voltages across the serially-coupled resistance windings. Prior detectors have utilized bifilar windings to overcome undesirable induced voltages and the present apparatus is distinctly advantageous in that the windings may be of simple single-wire design.

Figure 3:
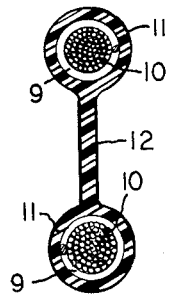
Figure 3 is a cross section of the detector as shown in Figure 2.

The two cores and coils may have a heat-resistant flexible plastic covering and spacing material extruded about them, this operation being conveniently performed on continuous lengths which are then cut to shorter individual lengths for use in individual detector assemblies. The plastic covering, 11, surrounds the turns of the helical windings, tending to keep them properly spaced and protected, and also has an integral web or spacer portion, 12, between the two windings which preserves a pre-set parallel relationship between them. The cross-sectional view in Figure 3 illustrates this more clearly. Figure 4 presents a further detail of one of the core clusters of fibers with helical resistance wires about it and with the surrounding insulating coating.

Wires of the twin resistance windings are joined at one end in a twisted and soldered junction 13. At the opposite end, wires of each of the two windings are soldered to different ones of conductive terminals 14 which are bent into holding engagement with a relatively stiff and yet flexible insulating strip 15, through small accommodating openings in the strip. Heavy coupling leads 8, which are connected with a measuring instrument sensing the resistance of the helical windings, are also soldered to the conductive terminals. That some idea may be had concerning the dimensions of the windings and core, it is noted that typical cores with their helical windings in place have a diameter of only about 1/32 inch.

The elements described are sandwiched into a rugged and thin molded unit together with laminations of insulating fabric such as glass cloth. In Figure 2, a bottom strip or layer of fabric 16 is shown with the molded windings, junction 13, insulating strip 15 and the leads 8 superimposed. Narrower strips of fabric 17 are positioned on both sides of the pair of windings, and further strips 18 are laid atop and below the spacer portion 12, such that the unit is built up to a uniform thickness. A top strip of fabric 19 covers the entire length of the unit. The elements of this assembly are preferably brushed or otherwise coated with a polyester resin as they are put together, and, thereafter, the unit is placed in a mold cavity wherein high temperature and pressure are applied to cause a fusion of the coated elements into a thin and hardened molded unit which has a great degree of flexibility.

Should vibration or other disturbing forces cause two of the numerous small adjacent turns to become shorted, the overall resistance of units constructed in the foregoing manner will not vary appreciably, such that the units remain useful. Prior bifilar and longitudinally wound units could be rendered wholly useless if short circuiting occurred between certain proximately-disposed turns.

In one preferred alternative construction illustrated in cross section in Figure 5, the cores and helical windings are not separately coated. Instead, core and winding units, together with terminals, are set into cavities appearing between the fabric spacers 20, 21 and 22 sandwiched between top and bottom laminated fabric strips 23 and 24. Alternatively, a single laminated strip of fabric may be folded about the core and windings and spacers, rather than separate top and bottom strips being used. The resin coating ad subsequent molding, as heretofore described, produces a unit which has characteristics like those of the unit shown in Figure 2, with the further advantage that the molding resin 25 fills the spaces between the wires 9 and the surrounding fabric and renders unnecessary a separate extruded coating of the resistance wires.

Although specific embodiments of this invention have been referred to in connection with the disclosure thereof, it should be recognized that such reference has been of a descriptive rather than a limiting nature, and that various changes, substitutions, combinations or modifications may be employed in accordance with these teachings without departing either in spirit or scope from this invention in its broader aspects.

What we claim as new and desire to secure by Letters Patent of the United States is:

1. A resistance temperature detector comprising a pair of elongated parallel and resilient cores each comprised of a plurality of flexible insulating fibers, fine electrical resistance wires each wound helically around substantially the full length of a different one of said cores and with close spacing between adjacent turns, an electrical junction of said wires at one end of said helical windings, electrical connectors coupled with said wires at the ends of said helical windings opposite said one end, insulating means separating said wound cores in parallel relationship, and insulating fabric means, said parallel cores, windings, junction, connectors and insulating means being sandwiched in and bonded with said insulating fabric means as a unit.

2. A resistance temperature detector comprising a pair of elongated, parallel and resilient cores each comprised of a plurality of fine insulating fibers, two fine electrical resistance wires each wound helically along substantially the full length of a different one of said cores and with close spacing between adjacent turns, said wires being wound in different directions about said cores, a pair of electrical connecting leads, means coupling said windings serially with said leads, insulating means positioning said wound cores in a parallel and separated relationship, insulating fabric means, and means bonding said parallel cores, windings, insulating means, coupling means, and portions of said connecting leads, with one another and in sandwiched relationship with layers of said fabric means.

3. A resistance temperature detector comprising a first layer of insulating fabric; a second layer including a pair of elongated, parallel, and resilient cores each comprised of a plurality of fine insulating fibers, two fine electrical resistance wires each wound helically along substantially the full length of a different one of said cores and with close spacing between adjacent turns, said wires being wound in different directions about said cores, a pair of electrical connecting leads, means coupling said windings serially with said leads, and insulating means having two parallel elongated openings in which said wound cores are positioned; and a third layer of insulating fabric, said second layer being bonded with and sandwiched between said first and third layers.

4. A resistance temperature detector comprising a first layer including a thin insulated fabric strip; a second layer including a pair of elongated, parallel and resilient cores each comprised of a plurality of fine insulating fibers, two fine electrical resistance wires each wound helically along substantially the full length of a different one of said cores and with close spacing between adjacent turns, said wires being wound in different directions about said cores, a pair of electrical connecting leads, means coupling said windings serially with said leads, insulating means disposed about said wound cores and rendering said second layer of substantially uniform thickness; and a third layer including a thin insulated fabric strip, said second layer being molded with and between said first and third layers to form a thin and elongated detector unit.

5. A resistance temperature detector comprising a first thin and elongated layer of insulating fabric; a second layer including three uniform-thickness parallel strips of insulating fabric spaced to form two parallel slots, a pair of elongated and resilient cores in said slots and each comprised of a plurality of fine glass fibers, two fine electrical resistance wires each wound helically along substantially the full length of a different one of said cores with close spacing between adjacent turns, said wires being wound in different directions about said cores, a pair of electrical connecting leads, and means coupling said windings serially with said leads; and a third thin and elongated layer of insulating fabric, said second layer being molded with and between said first and third layers to form a thin and elongated detector unit.

6. A resistance temperature detector comprising a first thin and elongated layer of insulating fabric; a second layer including a pair of elongated glass string cores each comprised of a plurality of fine glass fibers, two fine electrical resistance wires each wound helically along substantially the full length of a different one of said cores with close spacing between adjacent turns, said wires being wound in different directions about said string cores, insulating means positioning said wound cores in a spaced parallel relationship, an electrical junction of said wires at one end of said parallel cores, a pair of electrical connecting leads coupled one each with a different one of said wires at the end of said parallel cores opposite said one end, and a pair of spaced parallel strips of insulating fabric, said parallel wound cores, junction, insulating means, and leads being positioned in the space between said strips; a third layer of insulating fabric dimensioned the same as said first layer; and an insulating resin molding said second layer with and between said first and third layers to form a thin and elongated molded detector unit.

References Cited in the file of this patent

UNITED STATES PATENTS

| | | |
|---|---|---|
| 2,585,443 | Cox | Feb. 12, 1952 |
| 2,619,573 | Dawson | Nov. 25, 1952 |